(12) United States Patent
Eissinger et al.

(10) Patent No.: US 7,044,541 B1
(45) Date of Patent: May 16, 2006

(54) CHILD'S BICYCLE SEAT

(75) Inventors: Che Eissinger, 2460 Titleist, Post Falls, ID (US) 83854; Steve Lambert, Richland, WA (US)

(73) Assignee: Che Eissinger, Riverton, UT (US)

( * ) Notice: Subject to any disclaimer, the term of this patent is extended or adjusted under 35 U.S.C. 154(b) by 72 days.

(21) Appl. No.: 10/683,184

(22) Filed: Oct. 10, 2003

(51) Int. Cl.
*B62J 1/00* (2006.01)

(52) U.S. Cl. .................... 297/195.12; 297/195.13; 280/202

(58) Field of Classification Search .......... 297/215.1, 297/215.11, 215.12, 195.1, 243, 250.1, 195.12, 297/195.13; 280/288.4, 202
See application file for complete search history.

(56) References Cited

U.S. PATENT DOCUMENTS

| | | | |
|---|---|---|---|
| 460,031 A * | 9/1891 | Rastetter et al. ............ 297/243 |
| 615,106 A * | 11/1898 | Satterthwaite .............. 297/243 |
| 740,905 A * | 10/1903 | Otterbein .................... 280/202 |
| 2,321,752 A * | 6/1943 | Kerr ........................... 280/202 |
| 3,743,321 A * | 7/1973 | Luschen et al. ........ 280/202 X |
| 3,902,737 A | 9/1975 | Berger et al. ............... 280/202 |
| 4,305,532 A | 12/1981 | Reminger |
| 4,632,453 A | 12/1986 | Robbin et al. .............. 297/243 |
| 4,919,479 A | 4/1990 | Loewke et al. |
| 5,104,188 A | 4/1992 | Jefferson |
| 5,330,215 A | 7/1994 | Bishaf et al. ............... 280/202 |
| 5,370,441 A * | 12/1994 | Chuang .................... 297/250.1 |
| 5,800,014 A * | 9/1998 | Musso, Jr. .................. 297/243 |
| 5,927,801 A | 7/1999 | Miree ....................... 297/195.1 |

\* cited by examiner

*Primary Examiner*—Anthony D. Barfield
(74) *Attorney, Agent, or Firm*—Shane P. Coleman; Holland & Hart LLP

(57) ABSTRACT

A mid-mounted child's bicycle seat is disclosed for connecting to a bicycle behind the bicycle's handle bars and in front of the rider of the bicycle. The seat includes a seat body and a mounting system that is adapted to connect the seat body to a handlebar stem the bicycle. As the handlebars turn, the seat turns as well. The mounting system includes a mounting bracket that attaches to the handlebar stem and a mounting stem that extends outward from the mounting bracket, toward the rider of the bike, when the handlebars are facing forward. A bottom portion of the seat body connects to the mounting stem.

18 Claims, 15 Drawing Sheets

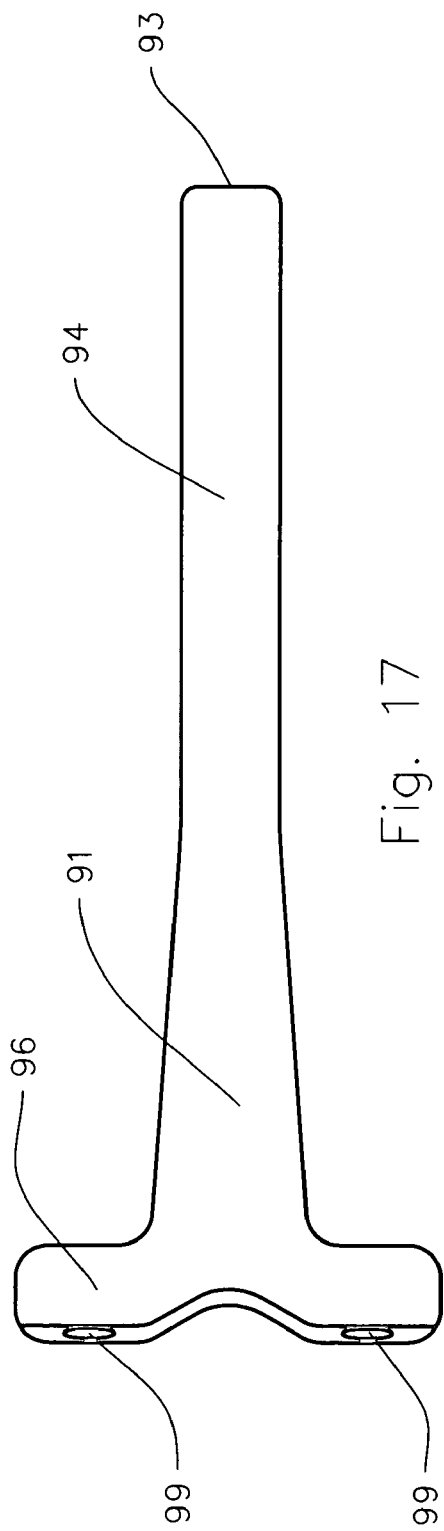
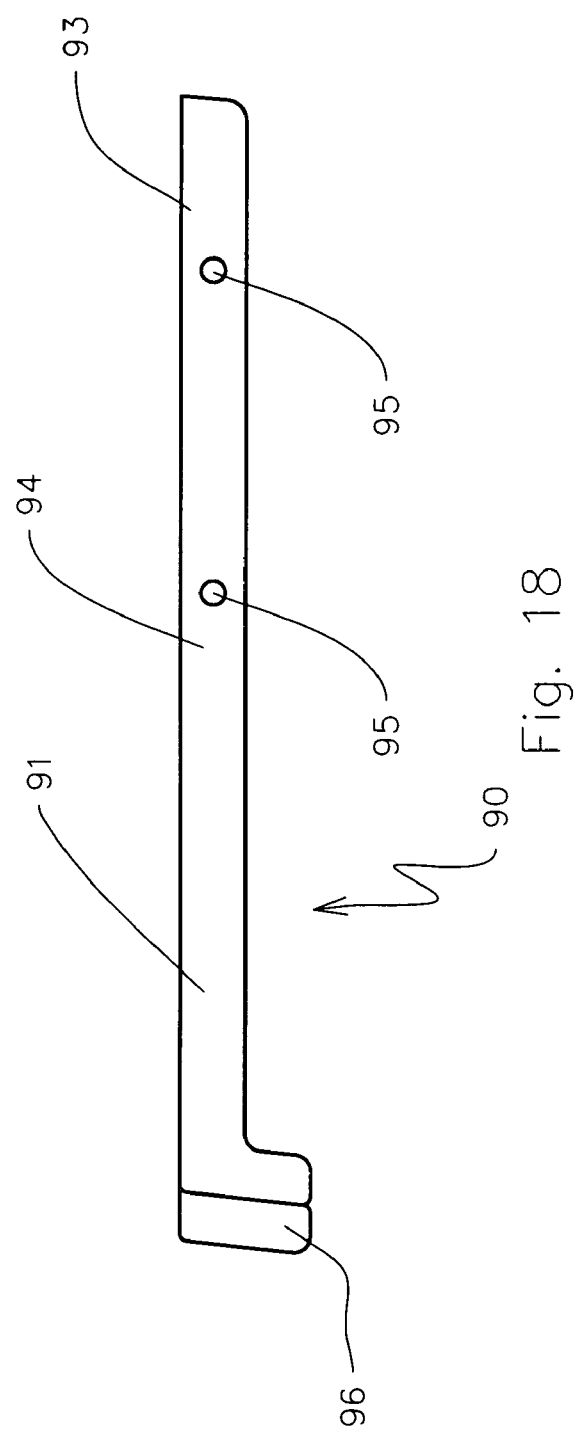

CHILD'S BICYCLE SEAT

FIELD OF INVENTION

The present invention relates generally to a seat for carrying a child on an adult's bicycle. More particularly, it relates to seat that mounts to the bicycle between the handle bars and the adult rider's seat.

BACKGROUND

For many individuals who ride bicycles it is desirable to be able to take small children along for the ride. Various child seats and other devices allow children to ride on bicycles with adult riders. For example, some bicyclists use trailers that pull behind the bike and ride on wheels of their own. Other bicyclists use child seats that connect to the bike such that the child rides up high with the adult rider. In one example, child bike seats are positioned behind the user's bike seat, on the rear of the bicycle. Other child bike seats mount to the bike between the adult rider and the handlebars, such that the child is positioned in front of the rider. These types of bike seats are sometimes referred to as "front-mounted" or "mid-mounted" seats, and these terms are used synonymously herein to refer to any child bike seat that is positioned generally in front of the adult rider's bike seat.

Existing front-mounted or mid-mounted bike seats are difficult to use because they require complicated mounting techniques and do not readily attach to various types of bikes. For example, some types of mid-mounted seats attach only to men's bike frames but not to women's bike frames having a slanted top frame member. Other mid-mounted seats require additional support parts that must be connected between parts of the bike frame. Another problem with conventional mid-mounted bike seats is that the seat and the child rider sometimes get in the way of the user when the user turns the handle bars. What is needed is an improved mid-mounted child bike seat.

SUMMARY

A mid-mounted child's bicycle seat is disclosed for connecting to a bicycle behind the bicycle's handle bars and in front of the rider of the bicycle, riding on the bike seat. The child seat includes a seat body that holds a child and a mounting system that is adapted to connect the seat body to a handlebar stem the bicycle. As the handlebars turn, the seat turns as well. The mounting system includes a mounting bracket that attaches to the handlebar stem and a mounting stem that extends outward from the mounting bracket, toward the rider of the bike, when the handlebars are facing forward. A bottom portion of the seat body connects to the mounting stem. In one embodiment, the seat body includes a mounting sleeve connected to a bottom portion of the seat body, and the mounting sleeve receives the mounting stem when the seat body is in use. The mounting bracket and stem may remain connected to the handlebar stem, while the seat body may be quickly and easily removed from the mounting stem, in one embodiment, when the child seat is not in use.

A cycle, such as a bicycle or tricycle, is also disclosed having a frame and forks that are adapted to hold a wheel. Handlebars control movement of the forks, which in turn cause the wheel to turn. A handlebar stem extends between the handlebars and the forks. A child seat mounting bracket is connected to the handlebar stem and has a mounting stem that extends generally toward a rear portion of the frame. A seat body is connected to the mounting stem by a mounting sleeve, which is attached to a bottom portion of the seat body.

A seat is also disclosed having a bottom portion and a back portion, each connected to two side portions. The seat also has two separate leg extensions that hold a child's legs apart from each other, on either side of a portion of a bicycle frame, in use. Each leg extension includes a bottom portion and an inner side portion. In use with a bicycle, the leg extensions extend underneath the handlebars of the bicycle, and the inner side portions prevent the child's legs from getting entangled with the brake lines. A mounting sleeve is connected to the bottom portion of the seat. The mounting portion has a longitudinal axis that bisects the leg extensions.

SUMMARY OF DRAWINGS

The detailed description will refer to the following drawings, wherein like numerals refer to like elements, and wherein:

FIG. 17 shows a top view of an alternative embodiment of a mounting system including a mounting stem having first and second ends;

FIG. 18 shows a side view of the mounting stem shown in FIG. 17;

DETAILED DESCRIPTION

Figure 1:
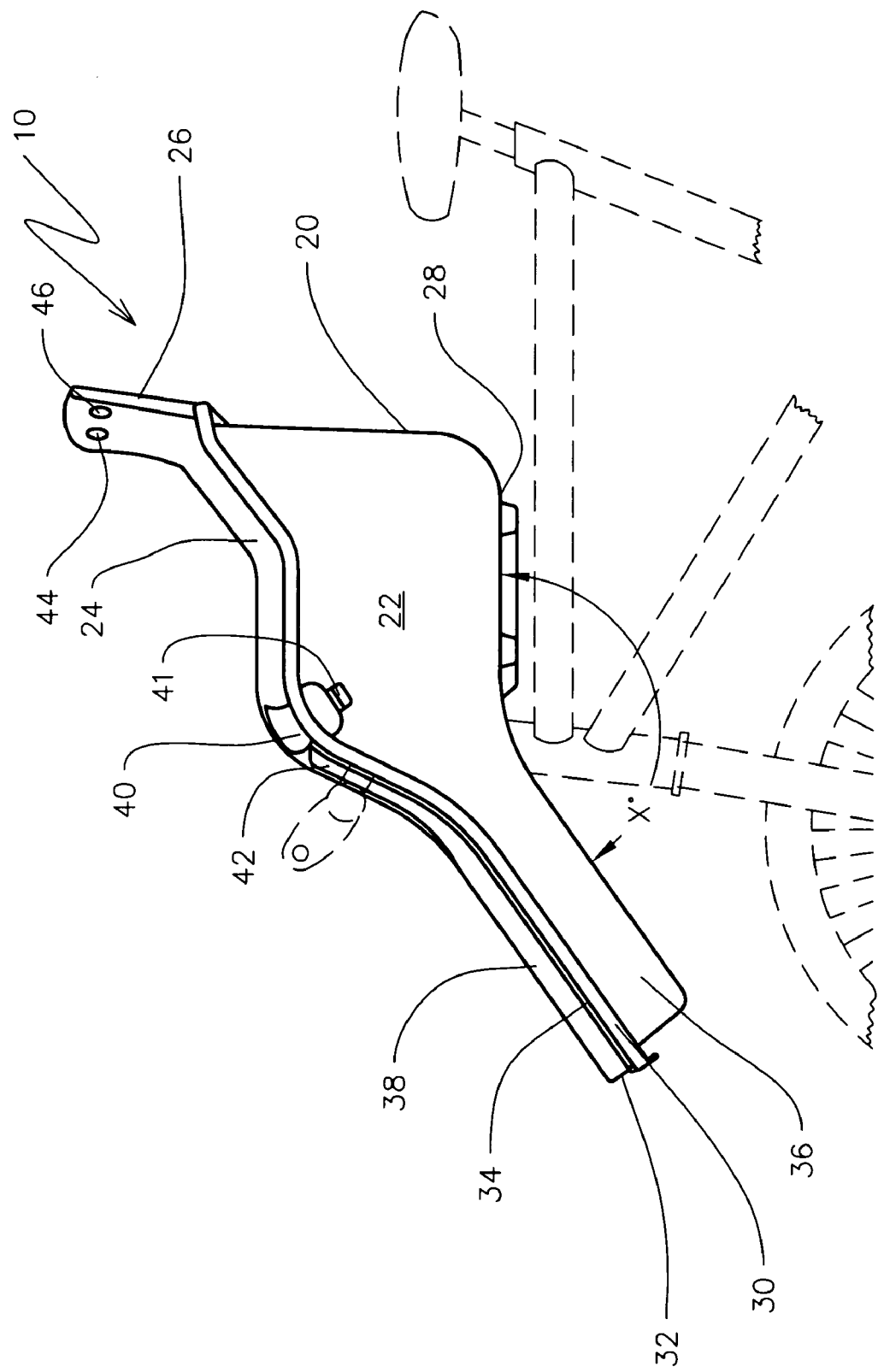
FIG. 1 shows a child bike seat connected to a bicycle the bike seat includes a seat body and a mounting system.

FIG. 1 shows a child bike seat 10 connected to a bicycle (shown in phantom-lines). The child seat 10 includes a seat body 20 and a mounting system (not shown). The body 20 includes first and second side walls 22, 24, a back portion 26, a bottom portion 28, and first and second leg extensions 30, 32. Each of the leg extensions 30, 32 includes a bottom wall 36 that supports a child's leg and an inner wall 34, 38 that keeps the child's legs from interfering with operation of the bicycle, for example by keeping the child's leg from contacting the brake controls (not shown). The seat body 20 also includes a strap system (not shown) that secures the child in the seat 10. The strap system (not shown) passes through holes 44, 46 in the back portion 26 of the seat body 20. The seat body 20 also includes a crossbar 40 connecting front portions of the first and second side walls 22, 24. In one embodiment, the crossbar 40 is detachably connected to one of the sidewalls 22 at a connector 41, which enables the crossbar 40 to be lifted in order to position the child in the seat 10. The inner walls 34, 38 of the leg extensions 30, 32 meet each other at a bridge 42 such that the child's legs are positioned on either side of the bridge 42 in use.

As shown in FIG. 1, the seat body 20 is positioned substantially between the handlebars of the bicycle and the rider of the bicycle. The seat body 20 is positioned substantially between the handlebars of the bicycle and the rider of the bicycle. The leg extensions 30, 32 extend underneath handlebars of the bicycle such that the child's legs are positioned beneath and slightly in front of the handlebars in use. The leg extensions 30, 32 deflect downward from the seat bottom 28 at an angle (X degrees) that allows the child's legs to remain safety above the front bicycle wheel. In the embodiment shown in FIG. 1, the angle formed between the leg extensions 30, 32 and seat bottom 28 allows the seat 10 to be turned relative to the bicycle frame without the leg extensions 30, 32 contacting bicycle frame. This allows steering of the bicycle without interference from the seat 10. In one embodiment, the angle (X degrees) is in the range of 130–150 degrees. In one particular embodiment, the angle (X degrees) is 140 degrees. Although not shown in FIG. 1, the seat 10 connects to a stem portion of the handlebars of the bicycle. In this manner, the seat 10 turns as the handlebars turn. Also, the seat body 20 detaches from the mounting system (not shown in FIG. 1), which may be done more easily when the handlebars are turned to one side or the other to provide more room when removing the seat body 20 from the mounting system (not shown).

Figure 2:
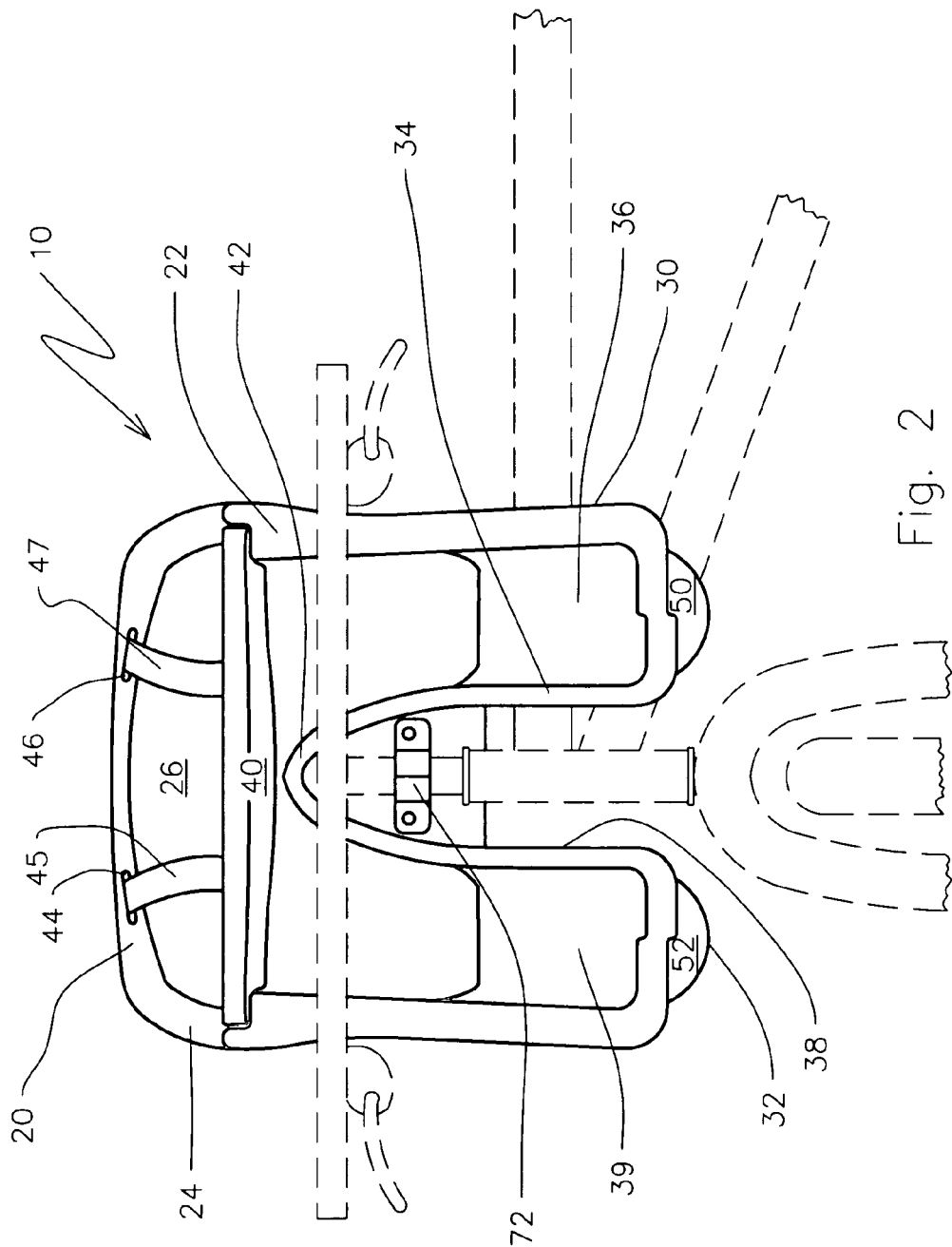
FIG. 2 shows a front view of the seat, with the handlebars of the bicycle turned.

FIG. 2 shows a front view of the seat 10, with the handlebars of the bicycle turned. In example of FIG. 2, the handlebars are turned to the left, illustrating that the bicycle seat 10 turns with the handlebars because the seat 10 is mounted on a handlebar stem portion of the bicycle. Straps 45, 47 are shown passing through the slots 44, 46 in the back portion 26 of the seat body 20. The straps 45, 47 shown in FIG. 2 pass over a child's shoulders in use. Also shown in FIG. 2, the leg extensions 30, 32 include inner sidewalls 34, 38 bottom walls 36, 39 and ends 50, 52. In one embodiment the ends 50, 52 serve as foot rests for the child sitting in the seat 10. The crossbar 40 in FIG. 2 connects the first and second sidewalls 22, 24 of the seat body 20. The mounting system (not shown) includes a first mounting bracket 72 that connects to a handlebar stem portion of the bicycle. Although not showed in FIG. 2, the mounting system (not shown) also includes a mounting stem (not shown) and the seat body 20 includes a mounting sleeve (not shown) the receives the mounting stem (not shown).

Figure 3:
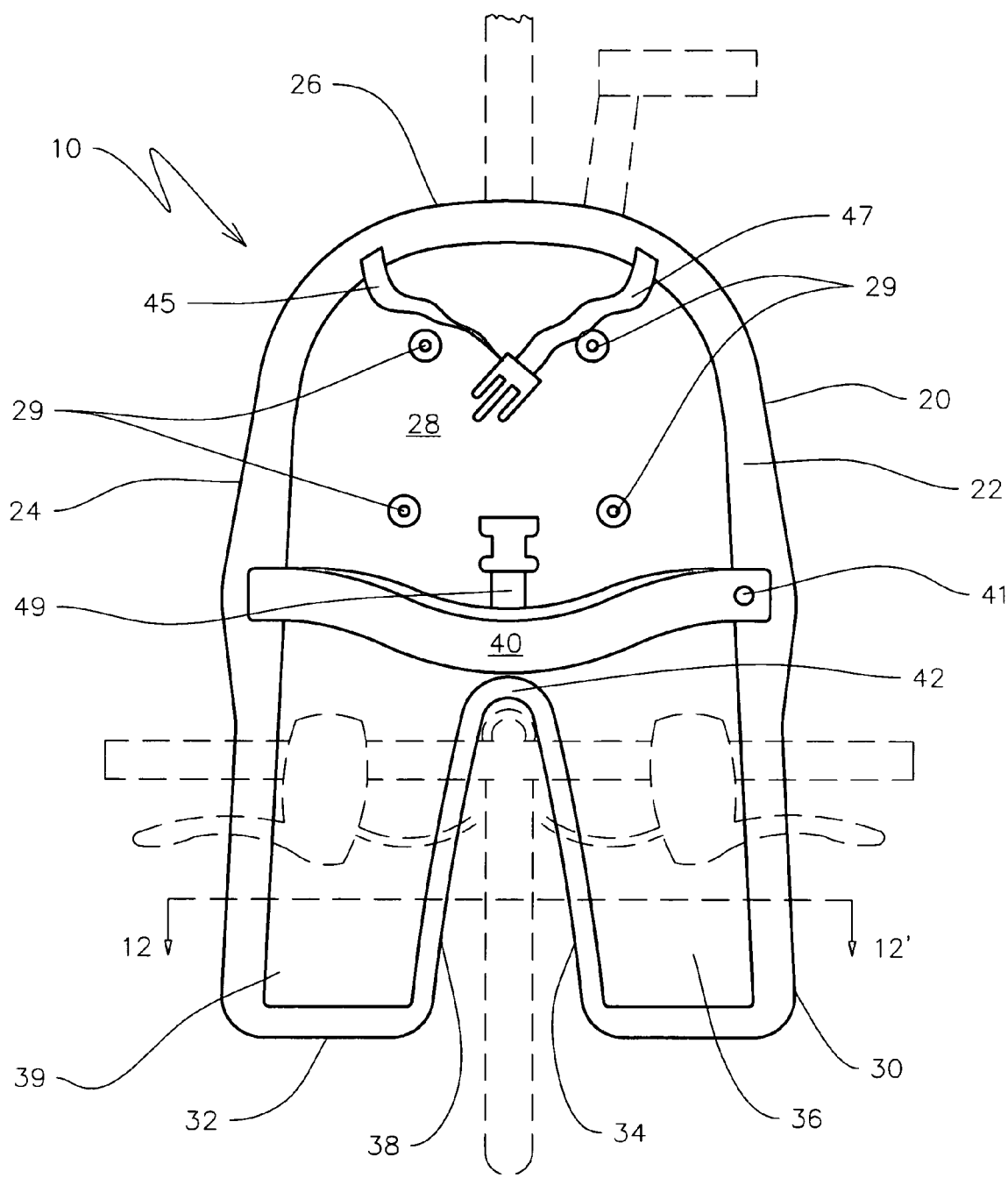
FIG. 3 shows a top view of the seat connected to a bicycle.

FIG. 3 shows a top view of the seat 10 connected to a bicycle (phantom lines). In one embodiment, the seat body 20 includes various portions formed from a single piece of plastic or other suitable material. In one example, the bottom 28, the back wall 26, the first and second side walls 22, 24, and the leg extensions 30, 32 are all formed from a single contiguous piece of material, such as plastic, metal, or fiberglass. The seat body 20 mounts to the mounting system (not shown) using a mounting plate (not shown) that is connected beneath the seat bottom 28 by bolts 29 or other suitable connectors. A center strap 49 connects to the seat body 20 at or near the bridge 42 and connects to the straps 45, 47 the pass over the child's shoulders.

Figure 4:
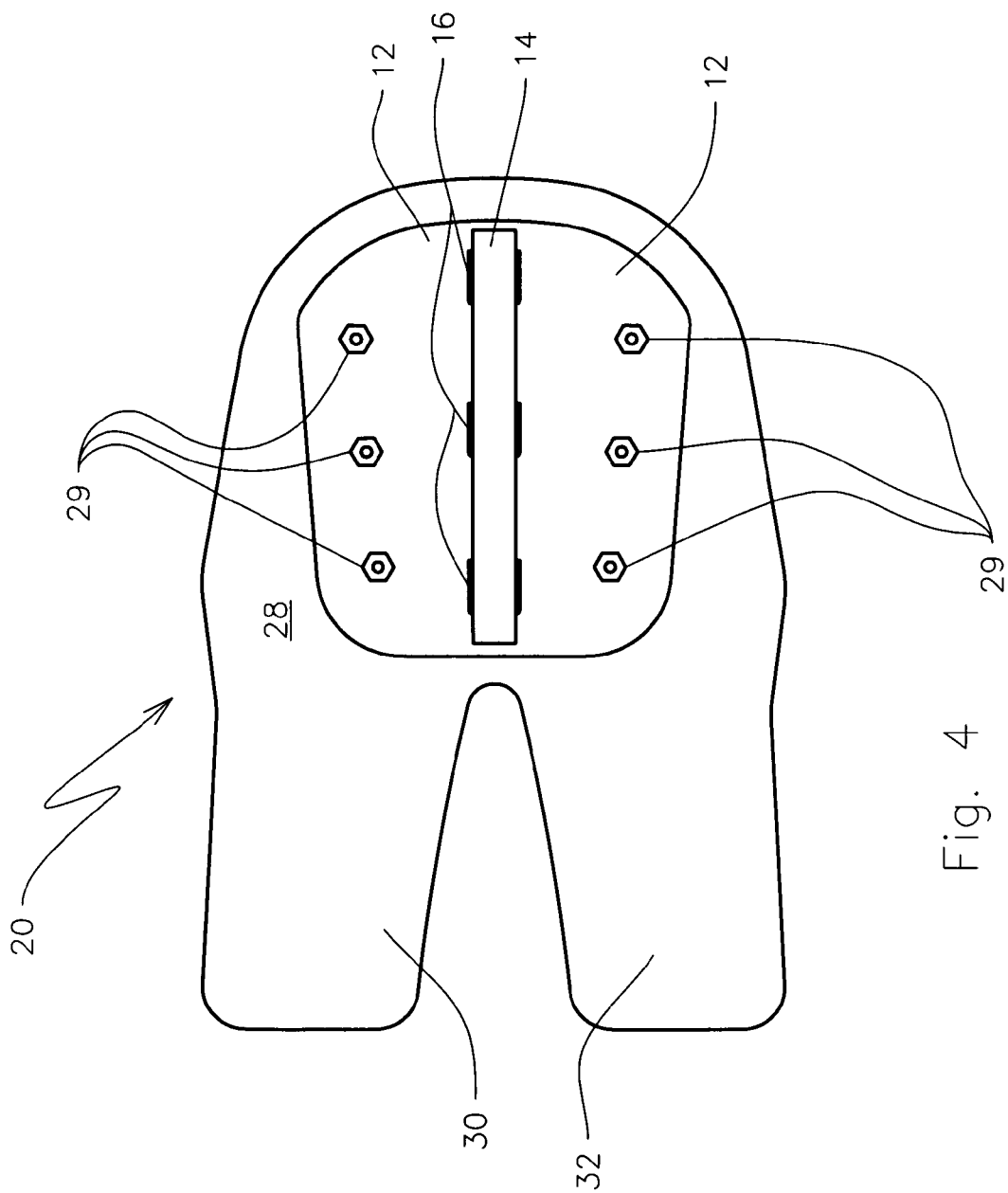
FIG. 4 shows a view of the bottom of the seat body.

FIG. 4 shows a bottom view of the seat body 20. A mounting plate 12 is connected to the seat bottom 28 by bolts 29 or other suitable connectors. A mounting sleeve 14 is connected to the mounting plate 12, for example, by welds 16. The mounting sleeve 14 runs generally along the center of the bottom portion 28 of the seat body 20. In this embodiment, the mounting sleeve 14 has a longitudinal axis that substantially bisects the angle created by first and second leg extensions 30, 32. The mounting sleeve 14 in one embodiment is square metal tube of a suitable length to receive a square metal mounting stem (not shown) that is part of the mounting system 70. The mounting sleeve 14 has a length that is suitably long enough to allow the seat body 22 to be positioned on the mounting stem (not shown) without substantial play or movement. In one embodiment, the mounting stem (not shown) is in the range of 5–8 inches long. In one embodiment, the mounting stem is approximately 6½ inches long. The mounting sleeve 14 is approximately as long as the stem, in one embodiment. In other embodiments, multiple, aligned mounting sleeves are used, where each sleeve is shorter than the mounting stem.

Figure 5:
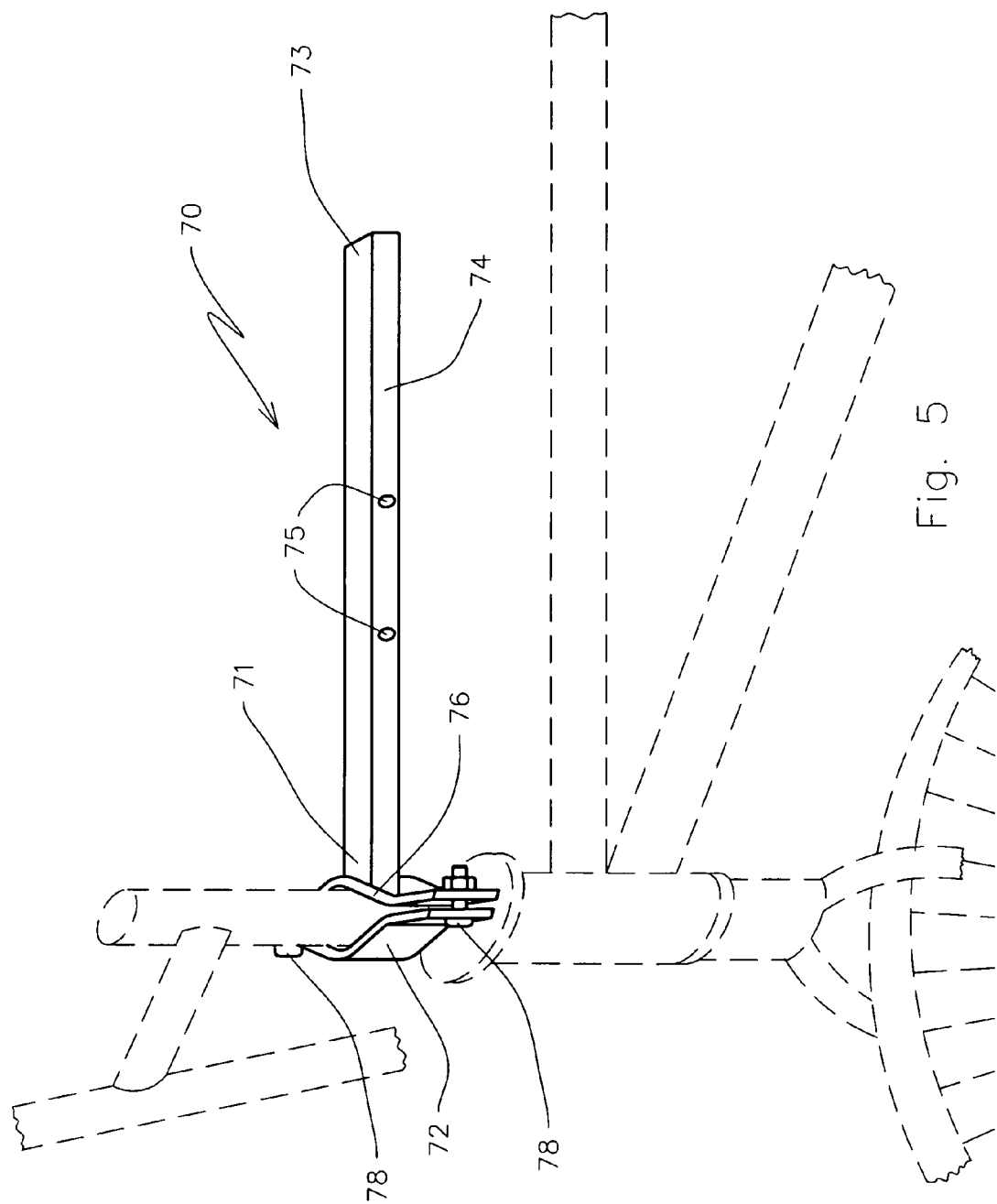
FIG. 5 shows a mounting system used to connect the seat body to a stem of the bicycle.

FIG. 5 shows a mounting system 70 used to connect the seat body (20 in FIGS. 1–4) to a handlebar stem of the bicycle. The mounting system 70 includes first and second mounting brackets 72, 76 that are connected to each other by bolts 78 or similar connectors. The mounting system 70 includes a mounting stem 74 having first and second ends 73, 71. The second end 71 is fixedly connected to the second bracket 76 in the embodiment of FIG. 5. The first end 73 of the mounting stem 74 is received by the mounting sleeve (14 in FIG. 4) and enables the seat body (20 in FIGS. 1–4) to connect to the mounting system 70. In the example of FIG. 5, the mounting stem 74 has a substantially square cross-section and fits snuggly in the substantially square mounting sleeve (14 in FIG. 4). The mounting stem 74 also includes holes 75 that are used to connect the seat body 20 to the mounting stem 74. The mounting sleeve (14 in FIG. 4) in one embodiment includes similar holes that align with the holes 75 in the mounting stem 74, shown in FIG. 5. In this embodiment, pins or similar connectors (not shown) are used to connect the mounting sleeve (14 in FIG. 4) to the mounting stem 74, through the holes 75.

Figure 6:
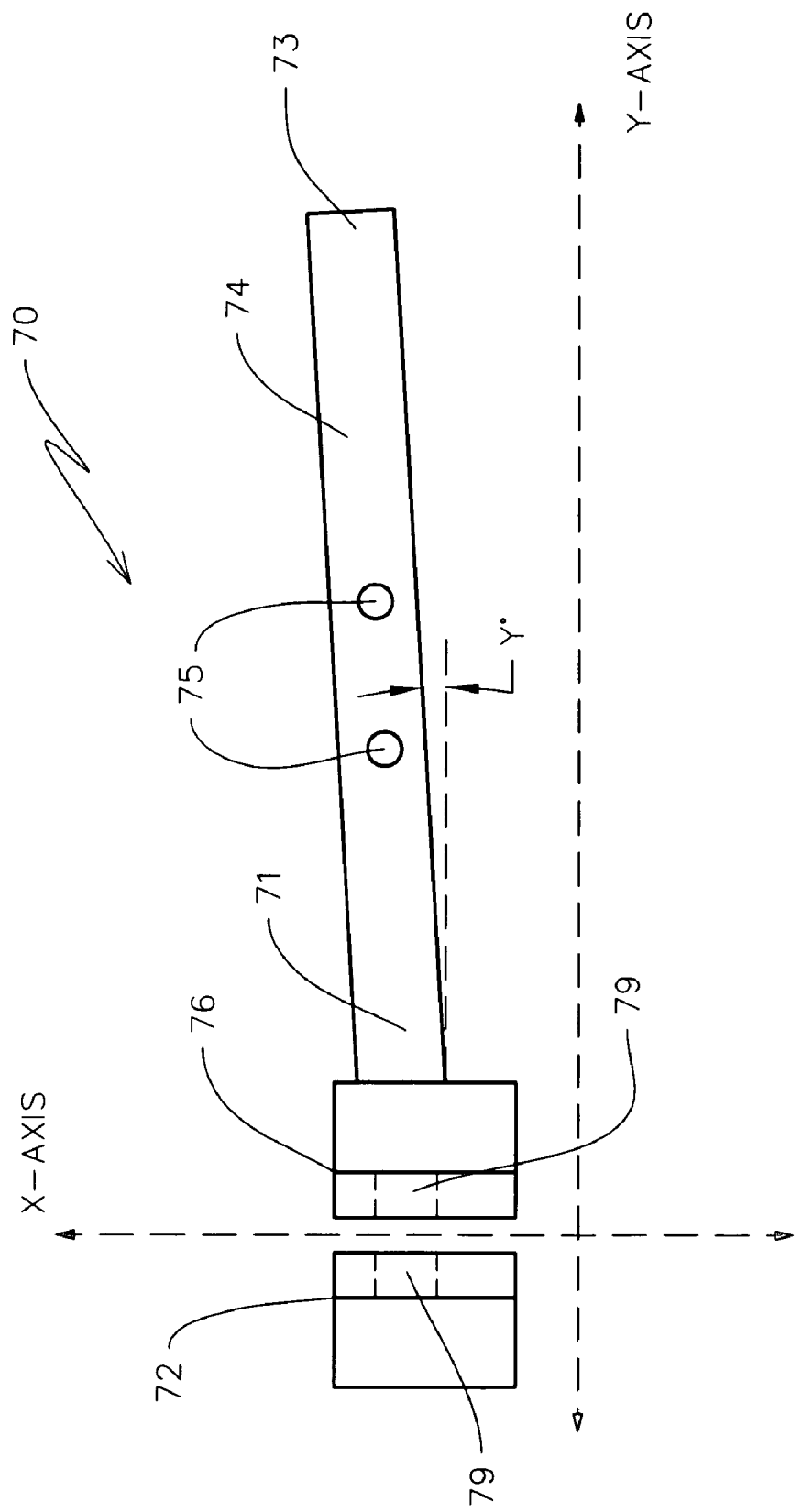
FIG. 6 shows a side view of the mounting system shown in FIG. 5.

FIG. 6 shows a side view of the mounting system 70 shown in FIG. 5. In the embodiment of FIG. 6, the mounting stem 74 extends from the second mounting bracket 76 at an angle (Y degrees) that is not precisely perpendicular to the handlebar stem. The first and second mounting brackets 72, 76 engage a handlebar stem (not shown) of the bicycle that rotates relative to the bicycle frame about an axis of movement (the "longitudinal axis" of the handlebar stem). This axis along which the first and second mounting brackets 72, 76 connect to the handlebar stem is referred to as the "X axis" in FIG. 6. FIG. 6 also shows a "Y axis" perpendicular to the X axis. In the example of FIG. 6, the X axis and the Y axis define a plane that also contains the mounting stem 74 when the front bicycle wheel is directed straight forward. By way of example, applying the coordinate system of FIG. 6 to an example bicycle, the bicycle frame as well as the mounting stem 74 would be generally aligned with the plane defined by the X and Y axes when the handlebars are directed forward, that is, when the front wheel is pointed straight ahead. As shown in FIG. 6, the mounting stem 74 engages the second connecting bracket 76 at a slight angle (Y degrees). The angle is Y degrees relative to the Y axis in the example of FIG. 6. In one embodiment, the angle (Y degrees) is in the range of 5–10 degrees (the corresponding angle between the mounting stem 74 and the handlebar stem is 80–85 degrees). In one embodiment, the angle (Y degrees) is approximately 7 degrees. The angle formed by the mounting stem 74 relative to the longitudinal axis of the handlebar stem causes the mounting stem 74 to be substantially horizontal when the bicycle is in use and when the handle bars are facing forward. In one example, the mounting stem 74 is parallel to a top frame member of the bicycle when the handlebars are directing the bicycle straight forward. The seat bottom 28 is substantially horizontal when bicycle is in use with the handlebars directing the bicycle straight forward. In one embodiment, the mounting stem 74 is formed from a ½ inch square piece of solid metal, and the mounting brackets 72, 76 have a height on approximately 1 inch.

Figure 7:
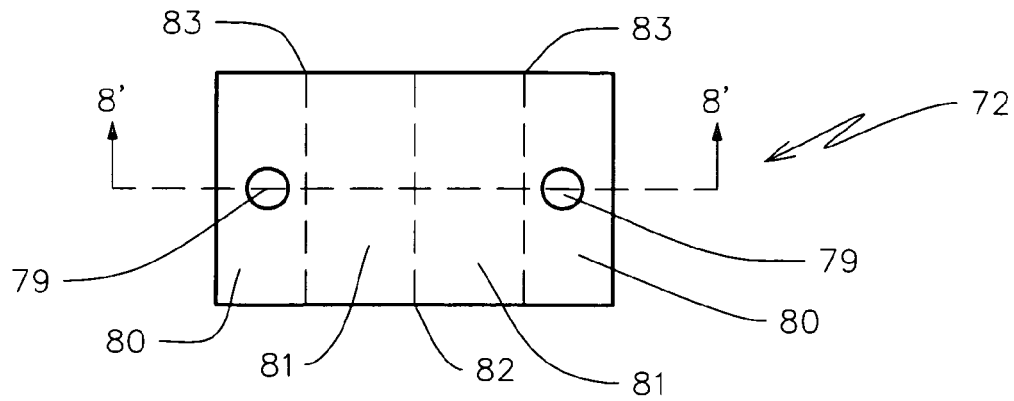
FIG. 7 shows a side view of the first mounting bracket.

FIG. 7 shows a side view of the first mounting bracket 72. The first mounting bracket 72 has two flat portions 80 on either end and has holes 79 defined therein. At corners 83 the flat portions 80 meet flat angle portions 81 that angle outward to allow the bracket 72 to wrap around the stem of a bicycle handlebars. The angle portions 81 abut each other at center point 82.

Figure 8:
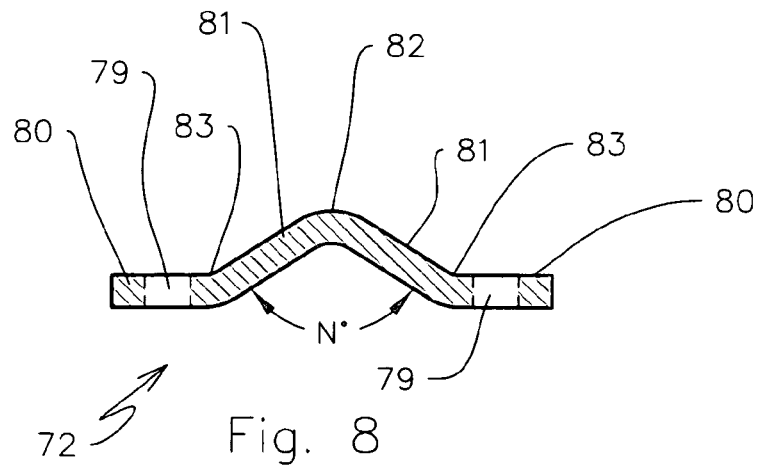
FIG. 8 shows a cross-section view of the first bracket portion shown in FIG. 7, taken along the line 8–8'.

FIG. 8 shows a cross-section view of the first bracket portion 72 shown in FIG. 7, taken along the line 8–8'. As shown in FIG. 8, the angle portions 81 abut each other at a mid-point 82 and form an angle with respect to each other (N degrees). In one embodiment the angle end is in the range of 120 to 150 degrees. In one embodiment, the angle N is 136 degrees.

Figure 9:
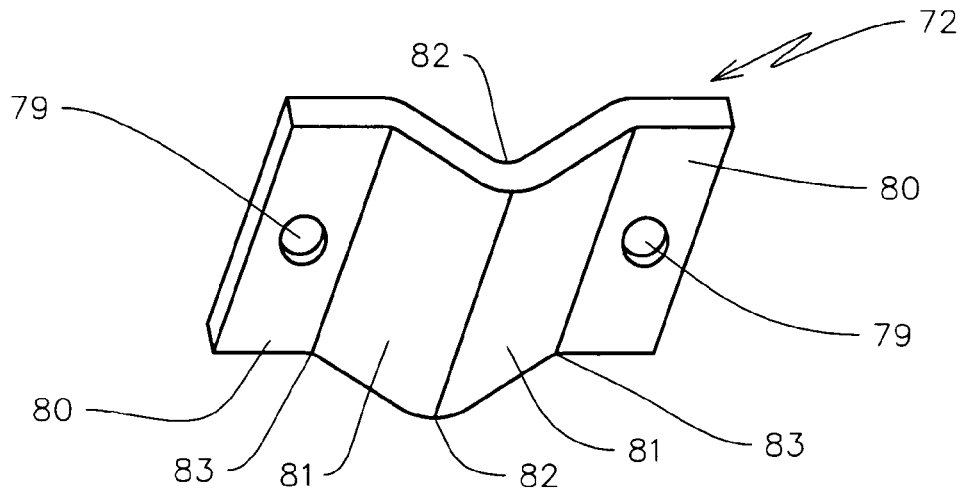
FIG. 9 shows a perspective view of the first bracket member shown in FIGS. 7 and 8.

FIG. 9 shows a perspective view of the first bracket member 72 shown in FIGS. 7 and 8. As shown in FIG. 9, the angle members 81 angle outward and meet at the mid-point 82 in order to allow the brackets 72 to wrap around a stem of a handlebars of a bicycle.

Figure 10:
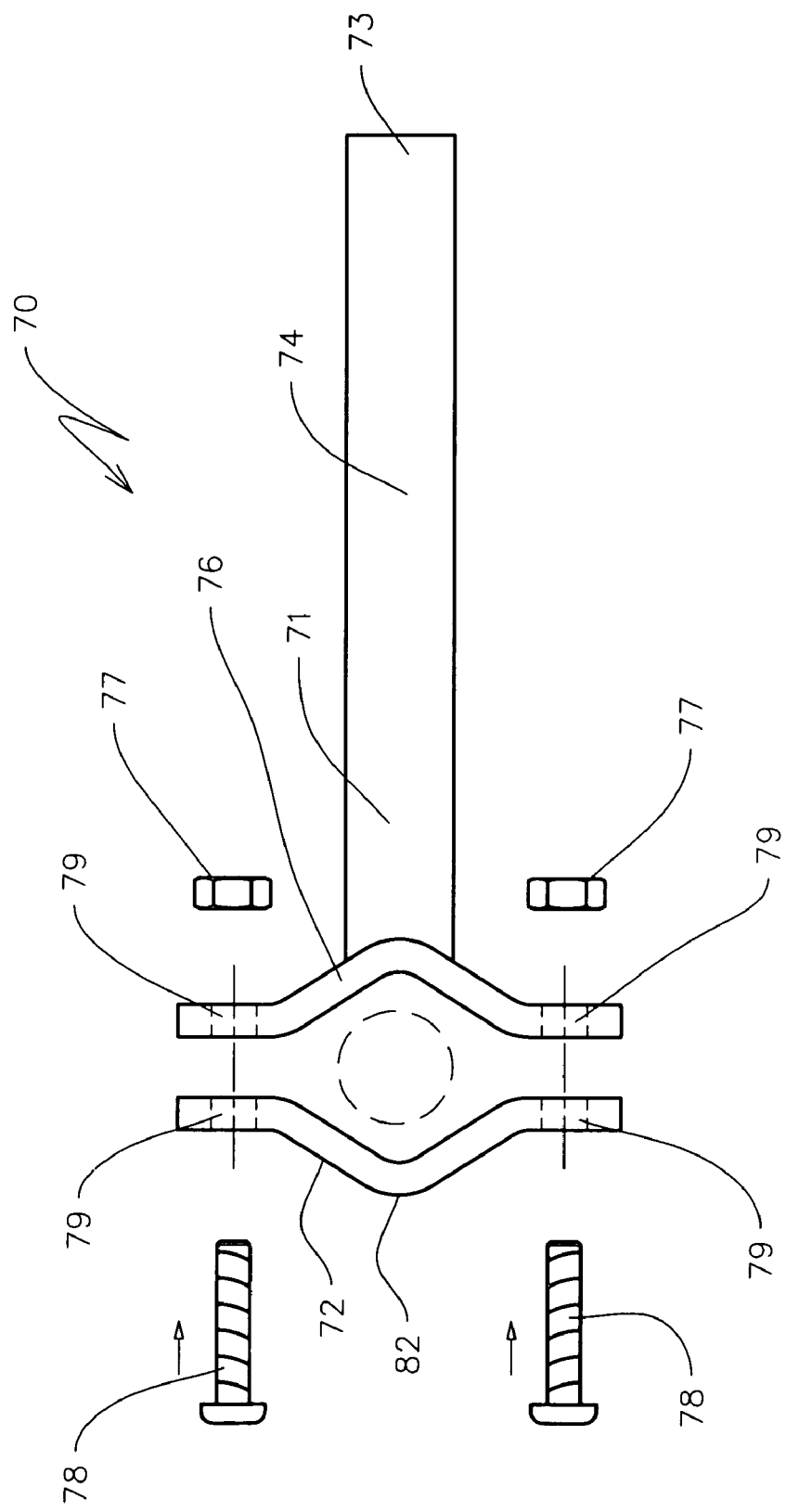
FIG. 10 shows a top view of the mounting system.

FIG. 10 shows a top view of the mounting system 70. As shown in FIG. 10, the second portion 71 of the mounting stem 74 abuts the second mounting bracket 76. The first and second mounting brackets 72, 76 connect to each other around a stem of a bicycle handlebars, shown in dashed lines. In the example of FIG. 10, the first and second mounting brackets 72, 76 connect to each other at flat portions 80 having holes 79 defined therein. Bolts 78 connect to nuts 77 through the holes 79.

Figure 11:
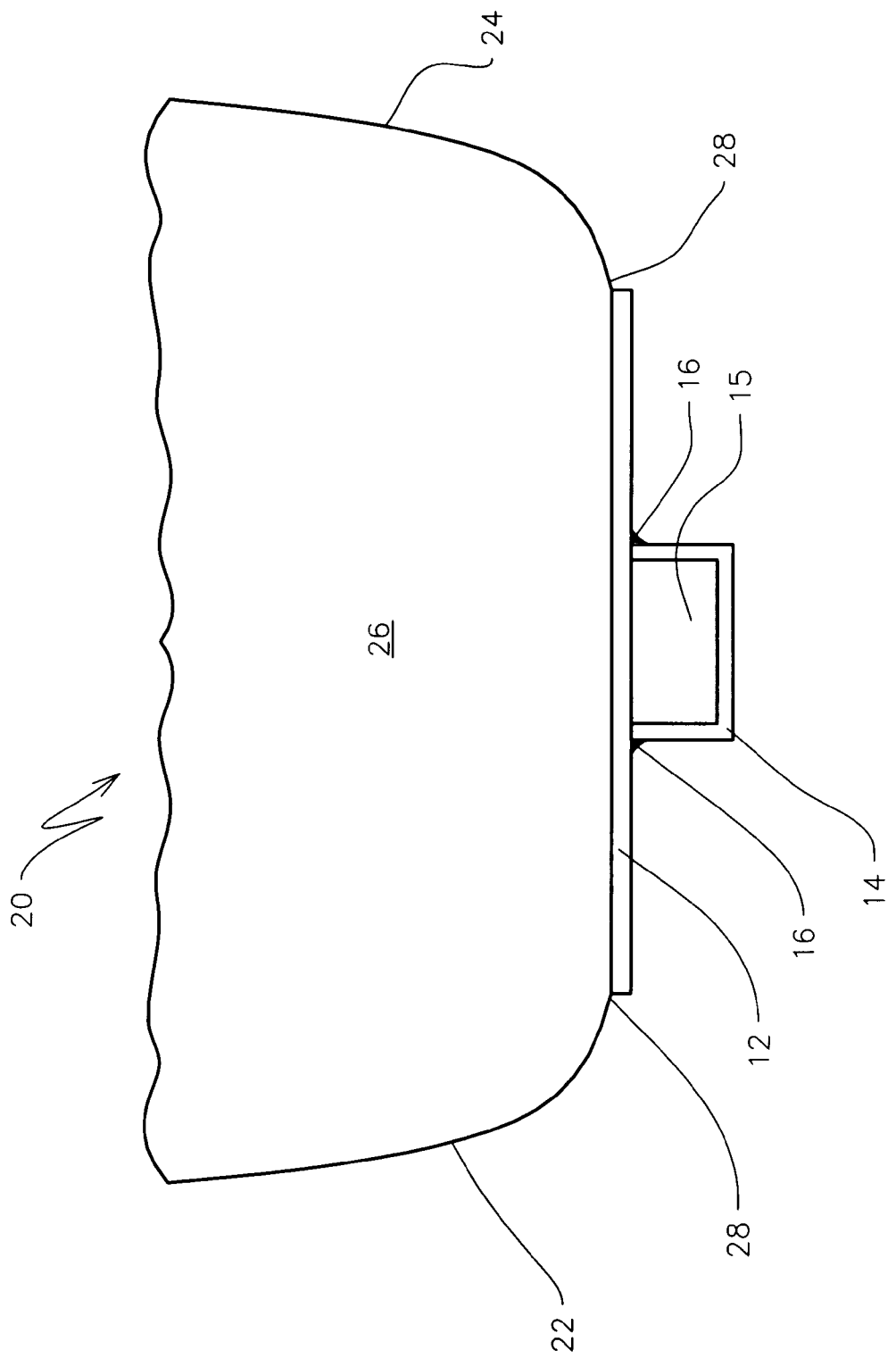
FIG. 11 shows a rear view of the lower portion of the seat body.

FIG. 11 shows a rear view of the lower portion of the seat body 20. In the example of FIG. 11, the side walls 22, 24 the back portion 26 and the bottom portion 28 of the seat body 20 are formed from a contiguous piece of material, such as plastic that has been molded to the desired shape. The mounting plate 12 is connected to the bottom 28 of the seat body 20. A mounting sleeve 14 is connected by welds 16 to the bottom of the mounting plate 12. In example of FIG. 11, the mounting sleeve 14 defines a cavity 15 that is substantially square in cross-section.

Figure 12:
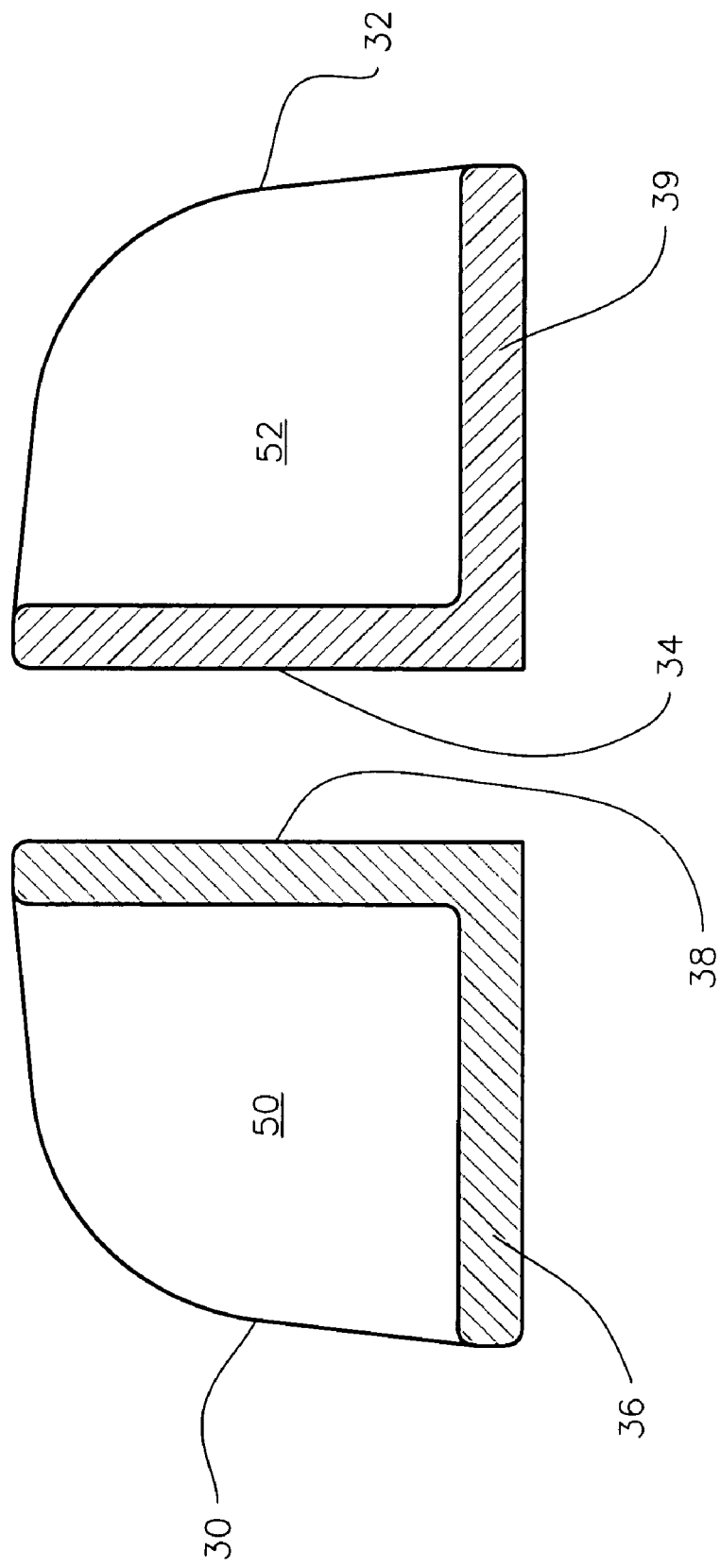
FIG. 12 show a cross-section view of the first and second leg extensions taken along the line 12–12' in FIG. 3.

FIG. 12 show a cross-section of the first and second leg extensions 30, 32 taken along the line 12–12' in FIG. 3. As shown in FIG. 12, the first and second leg extensions 30, 32 include bottom walls 36, 39 and inner walls 38, 34. The inner walls 38, 34 rise substantially perpendicular to the bottom walls 36, 39. Each leg extension 30, 32 has and end 50, 52 that may be used to rest the child's feet.

Figure 13:
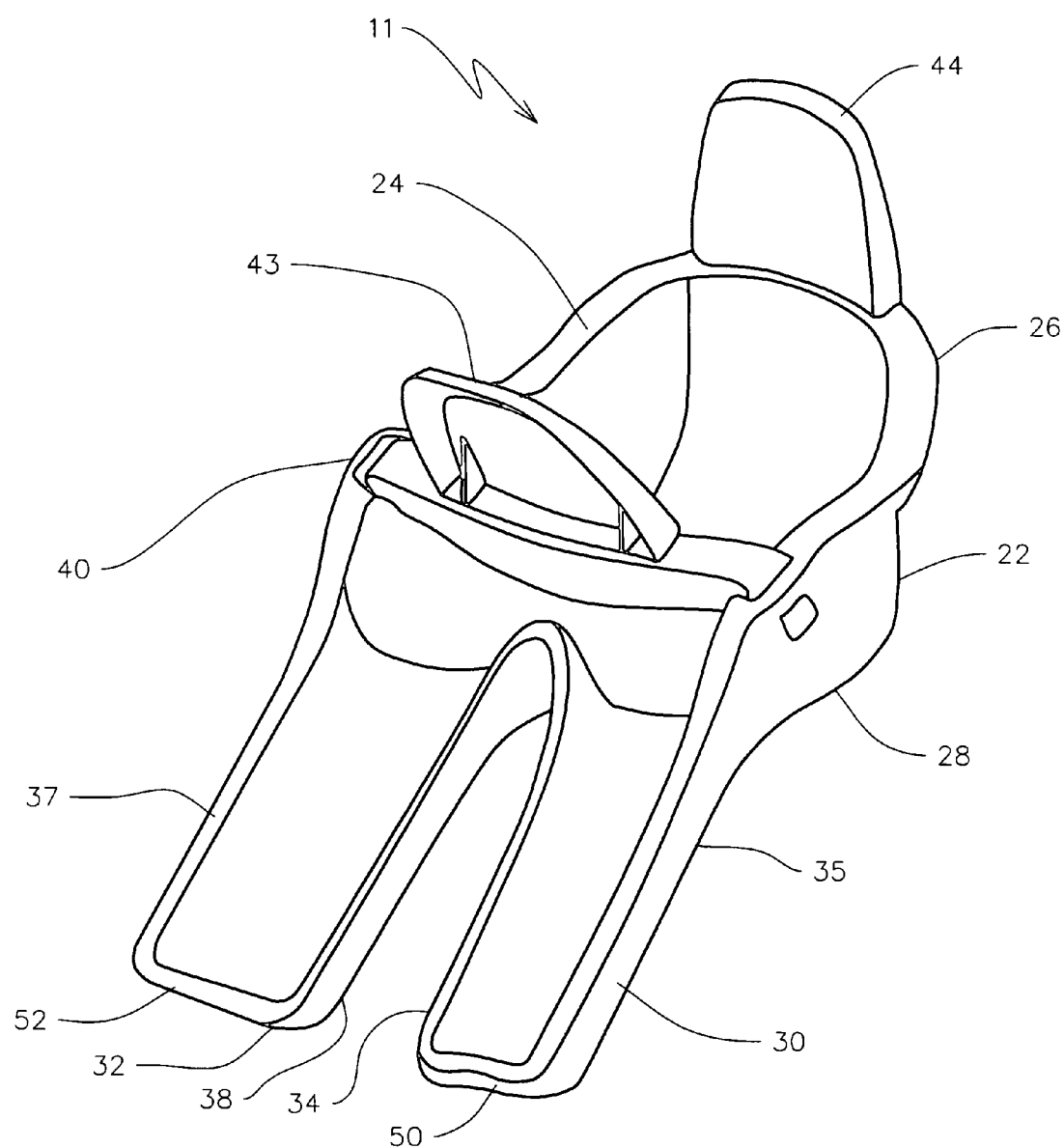
FIG. 13 shows a perspective view of an alternative embodiment of a child seat having a back headrest extending upward from the back of the seat body and a front headrest extending upward from the cross-member.

FIG. 13 shows a perspective view of an alternative embodiment of a child seat 11 having a back headrest 44 extending upward from the back 26 of the seat body 20 and a front headrest 43 extending upward from the crossbar 40. In the example of FIG. 13, the seat body 20 is formed from a single piece of material, such as a plastic. The rear headrest 44 allows the child to rest his or her head while sitting upright. The front headrest 43 allows a child to rest his or her head while slouching forward. In one embodiment, the front headrest 43 includes a recessed portion (not shown) for the child's head to rest. In the example of FIG. 13, the leg extensions 30, 32 include both inner sidewalls 34, 38 and outer sidewalls 35, 37 to contain the child's legs.

Figure 14:
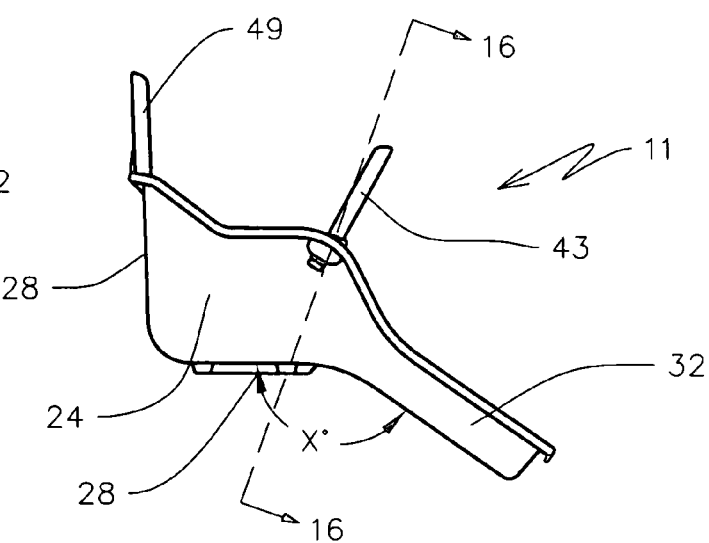
FIG. 14 shows a side view of the child seat shown in FIG. 13.

FIG. 14 shows a side view of the child seat 11 shown in FIG. 13. As shown, the front headrest 43 rises at an angle relative to a vertical axis of the seat 11. In this example, the vertical axis of the seat 11 refers to an axis that is normal to the plane containing the seat bottom 28. In the example of FIG. 14, the front headrest 43 generally rises at a 28-degree angle relative to the vertical axis of the seat 11. In the example of FIG. 14, the leg extensions 30, 32 are approximately 3.5 inches deep and 9.5 inches long. The seat sides 24, 22 are 6.5 inches high, and the seat back 26 is 9.2 inches high, before meeting the back headrest 44.

Figure 15:
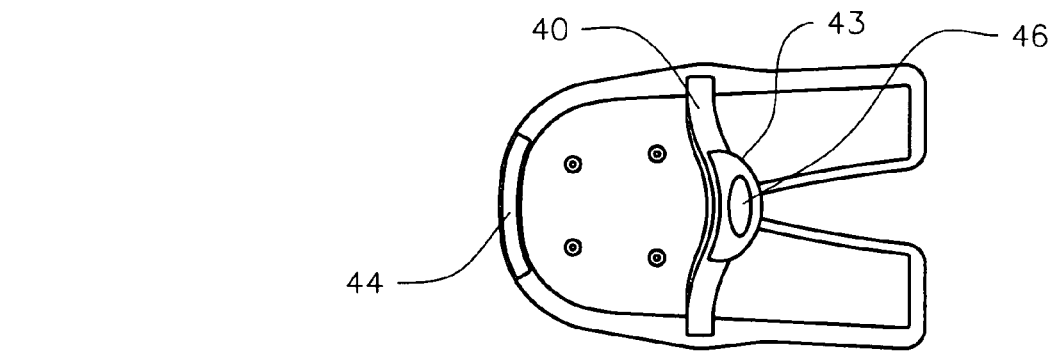
FIG. 15 shows a top view of the child seat shown in FIG. 14.

FIG. 15 shows a top view of the child seat 11 shown in FIG. 14. As shown in FIG. 14, the front headrest 43 includes a recessed portion 46 that is centered on the headrest 43. This recessed portion 46 receives the child's head when the child leans forward, for example, to rest. In the example of FIG. 15, the inside width of the seat bottom 28 is approximately 9 inches and the outside width is 12.2 inches. The widths of the insides of the leg extensions 30, 32 are 3 inches, and the widths of the outsides of the leg extensions 30, 32 are 5.5 inches. The example of FIG. 15 provides clearance for the child from the inside of the seat back 28 to the inside of the crossbar 40 of approximately 7.5 inches at the center of the seat body 20.

Figure 16:
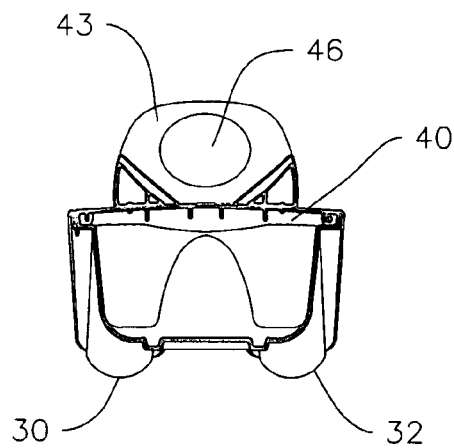
FIG. 16 shows a cross-section of the child seat shown in FIG. 14, taken along the line 16–16'.

FIG. 16 shows a cross-section of the child seat 11 shown in FIG. 14, taken along the line 16–16'. As shown in FIG. 16, the front headrest 43 is connected to the crossbar 40 that crosses the seat 11 in front of the child.

FIG. 17 shows a top view of an alternative embodiment of a mounting system 90 including a mounting stem 94 having first and second ends 93, 91. In the example of FIG. 17, the mounting stem 94 tapers from the first end 93 to the second end 91, such that the mounting stem 94 is approximately 0.75 inches wide at the second end 93, extends straight for 5 inches, and then tapers to a width of 1.25 inches at the first end 91, where the mounting stem 94 meets the second mounting bracket 96. The second mounting bracket 96 has flat surfaces on either end that include holes 99 used to connect the mounting system 90 to a bike frame. In the example of FIG. 17, the mounting stem is approximately 9 inches long.

FIG. 18 shows a side view of the mounting stem 94 shown in FIG. 17. The mounting stem 24 is approximately 0.5 inches high and includes holes 95 used to mount the stem 94 to the seat (e.g., 11 in FIG. 13). The holes 95 are positioned midway between the top and the bottom of the mounting stem 94 and have diameters of 0.19 inches in one example. The rearmost hole 95 is positioned 1.35 inches from the first end 93 of the mounting stem 94, and the holes 95 are spaced 2.5 inches apart. The first end 93 of the mounting stem 94 is not square in the example of FIG. 17, but instead angles 5 degrees from the top side of the stem 94 to the bottom side. The bottom corner of the first end 93 is curved in one example, having a radius of at least 0.16 inches.

In the example of FIG. 18, the second end 91 of the stem 94 connects to a second connector 96 that is used to connect the mounting system 90 to a bike. The flat portions of the second connector 96 are approximately 0.38 inches wide in this example. The flat portions of the second connector 96 form a front face (facing away from the stem 94) that forms a plane. The plane is not normal to the length of the stem 94, in one example, but instead is offset from a normal plane by an angle to accommodate the angle of the handlebar stem so that the child seat 11 is positioned substantially upright. That is, the handlebar stem normally is not exactly normal to the riding surface, but instead is angled back toward the rider. To attach the seat 11 to the stem of the bicycle in a manner that allows the seat 11 to remain substantially upright, the example of FIG. 18 provides an angle of 6 degrees relative to a normal plane. That is, an angle of 96 degrees (rather than 90 degrees) is used between the front face of the flat portions of the second connector 96 and the length of the mounting stem 94 in the example of FIG. 18.

Figure 19:
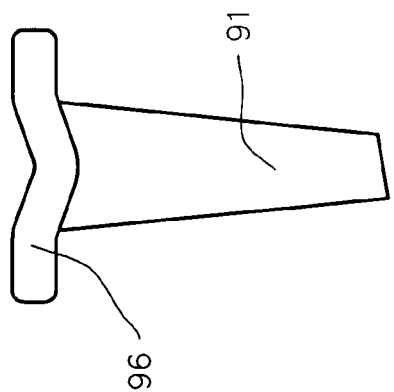
FIG. 19 shows a top view of the second connector shown in FIG. 18.

FIG. 19 shows a top view of the second connector 96 shown in FIG. 18. The second end 91 of the mounting stem 24 is connected to the second connector 96. The second connector has flat portions with holes defined therein (99 in FIG. 17), each of the flat portions having a width of 0.75 inches in the example shown in FIG. 19. Between the flat portions, the second connector 96 angles back toward the second end 91 of the mounting stem 94, forming an angle of approximately 68 degrees relative to the longitudinal axis of the mounting stem 94. In the example of FIG. 19, the length of the angled portion (the distance between the flat portions of the second connector 96) is 1.75 inches.

Figure 20:
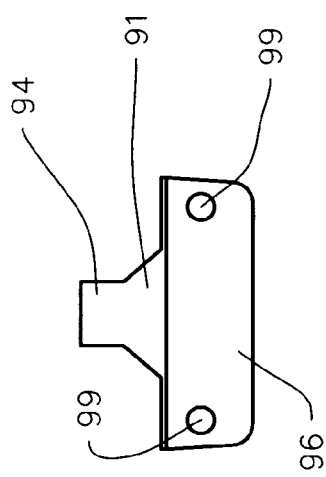
FIG. 20 shows a front view of the second connector shown in FIG. 19.

FIG. 20 shows a front view of the second connector 96 shown in FIG. 19. The second connector 96 is approximately 1 inch high and has holes 99 positioned 2.5 inches apart in flat portions of the second connector 96, approximately 0.6 inches from the bottom of the second connector 96.

Figure 21:
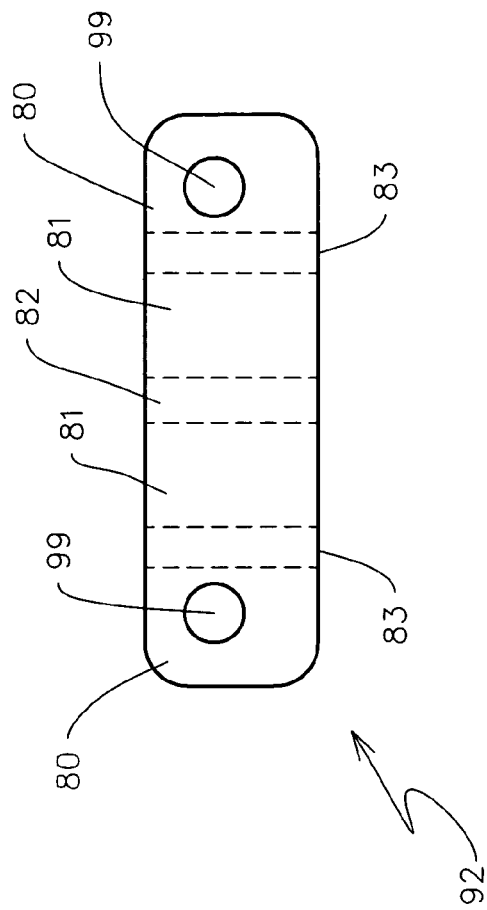
FIG. 21 shows a top view of one embodiment of a first connector, similar to the first connector shown in FIGS. 7–9.

FIG. 21 shows a top view of one embodiment of a first connector 72, similar to the first connector 72 shown in FIGS. 7–9. The first connector 72 has holes 99 positioned in flat portions 80 approximately 2.5 inches apart, which align with holes 99 in the second connector 96, shown in FIGS. 19 and 20. Like the second connector 96 shown in FIG. 19, the first connector forms a 136-degree angle. Together the angled portions 81 of the first and second connectors 72, 96 wrap around a stem of a bicycle in use. In one embodiment, the first connector 72 is 0.25 inches thick.

Figure 22:
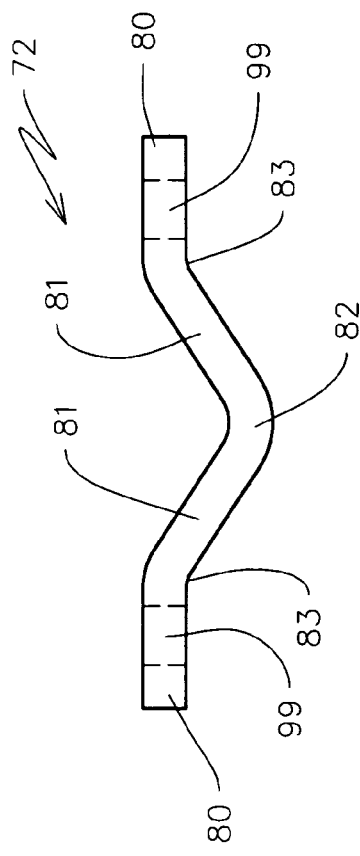
FIG. 22 shows a side view of the first connector shown in FIG. 21.

FIG. 22 shows a side view of the first connector 72 shown in FIG. 21. The first connector 72 is 1 inch wide in this example, and the holes 99 are positioned 0.6 inches from the bottom, to align with holes 99 in the second connector (96 in FIG. 20).

Figure 23:
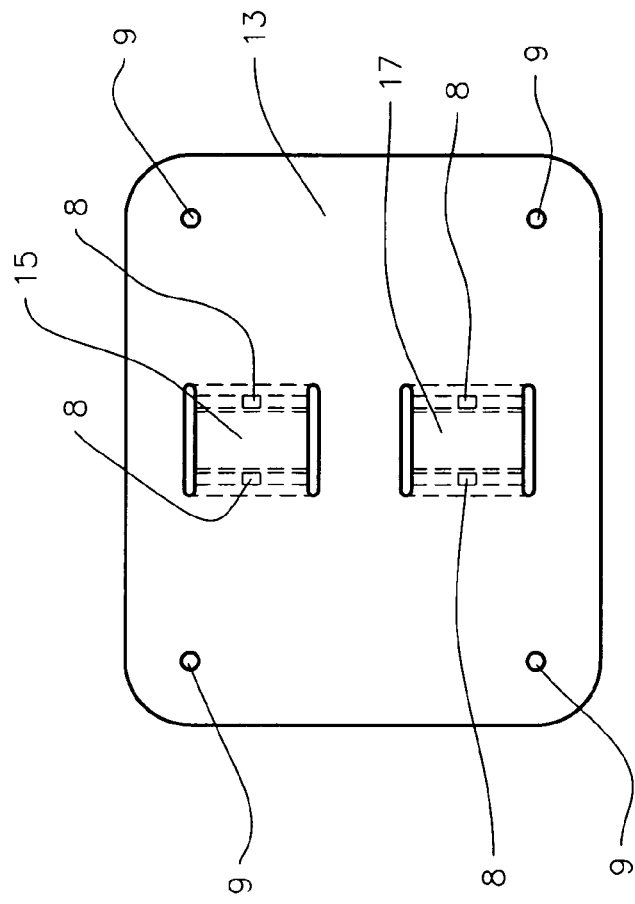
FIG. 23 shows a bottom view of an embodiment of a bottom plate that connects to the bottom of the seat portion of the bicycle seat.

FIG. 23 shows a bottom view of an embodiment of a bottom plate 13 that connects to the bottom 28 of the seat portion 20 of the bicycle seat 11. The plate 13 includes four holes 9 for attaching the plate 13 to the seat bottom 28. Two aligned sleeves 15, 17 are connected to the bottom of the plate 13 to connect the plate 13 to the mounting stem (e.g., 94 in FIG. 17). Each of the sleeves 15, 17 includes holes 8 that are used to connect the bottom plate 13 to the mounting stem 94. The holes 8 align with the holes 95 in the mounting stem 94 in use, to allow pins or other connectors to pass through the holes 8, 95 to secure the mounting plate 13 in place on the stem 94. In the embodiment of FIG. 23, the mounting plate 13 is approximately 6.7 inches wide and 5.5 inches long, with corners curved at 0.75 inch radii.

Figure 24:
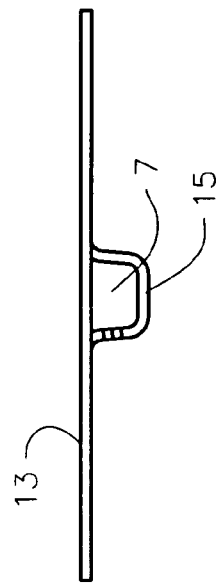
FIG. 24 shows a side view of the mounting plate shown in FIG. 23.

FIG. 24 shows a side view of the mounting plate 13 shown in FIG. 23. The sleeves 15, 17 define cavities 7 that are aligned to receive the mounting stem 94. The cavity is slightly larger than the cross-section of the mounting stem 94 to ensure a slug fit between the mounting stem 94 and the sleeves 15, 17. In the embodiment of FIG. 24, the cavity 7 is 0.51 inches high by 0.71 inches wide with 0.125 inch radii at the corners. In the example of FIG. 24, the sides of the sleeves 15, 17 are angled relative to each other at a 10-degree angle. In the example of FIG. 24, the base plate 13 is 0.125 inches thick.

Figure 25:
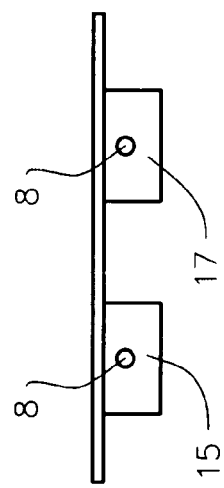
FIG. 25 shows another side view of the mounting plate shown in FIGS. 23 and 24.

FIG. 25 shows another side view of the mounting plate 13 shown in FIGS. 23 and 24. The sleeves 15, 17 are aligned. Each sleeve 15, 17 has holes 8 defined therein for attaching to a mounting stem 94. In the example of FIG. 25, the holes 8 are spaced 2.5 inches apart, and the mounting sleeves 15, 17 begin 0.9 inches from the ends of the plate 13 and are each 1.3 inches long. The holes 8 are positioned midway along the lengths of the mounting sleeves 15, 17 in this example.

Although the present invention has been described with respect to particular embodiments thereof, variations are possible. For example, although the child seat is illustrated in connection with a bicycle, one skilled in the art will recognize that it may be used in connection with various types of cycles having handlebars and a seat for an adult rider. The present invention may be embodied in specific forms without departing from the essential spirit or attributes thereof. It is desired that the embodiments described herein be considered in all respects illustrative and not restrictive and that reference be made to the appended claims and their equivalents for determining the scope of the invention.

What is claimed is:

1. A child's bicycle seat adapted for positioning a child between handlebars of a bicycle and a rider of the bicycle who rides on a seat of the bicycle, the child's bicycle seat comprising:
   a seat body;
   a mounting system capable of connecting the seat body to a handlebar stem of the bicycle such that the seat body is positioned substantially between handlebars of the bicycle and the rider of the bicycle, the mounting system comprising:
      a mounting bracket capable of fixedly connecting to the handlebar stem;
      an elongated mounting stem having a first end that extends from the mounting bracket; and
   an elongated mounting sleeve connected to a bottom side of the bottom portion of the seat body and positioned adjacent and generally parallel to the bottom side, wherein the mounting sleeve receives a second end of the mounting.

2. The seat of claim 1, wherein the seat body includes first and second leg extensions that connect to and extend outward from the bottom portion, wherein the leg extensions are adapted to extend on opposite sides of the handlebar stem when the seat is attached to a bicycle.

3. The seat of claim 2, wherein the leg extensions extend outward from the seat bottom at an angle relative to the seat bottom, such that when the seat is connected to the bicycle and the handlebars are directed forward, the leg extensions extend below the handlebars and are spaced away from a frame of the bicycle when the handlebars are turned.

4. The seat of claim 2, wherein the leg extensions further comprise:
bottom portions;
inner sidewalls rising from the bottom portions; and
ends connected to the bottom portions and inner sidewalls.

5. The seat of claim 1, further comprising a releaseable connector that secures the mounting stem in position along the mounting sleeve.

6. The seat of claim 1, wherein the seat body further comprises a crossbar and a front headrest connected to the crossbar, wherein the front headrest is generally planar and extends outward from the crossbar.

7. The seat of claim 1, wherein the mounting stem is capable of forming an angle relative to a longitudinal axis of the handlebar stem such that the mounting stem is substantially horizontal when the seat is attached to a bicycle whose front wheel is directed straight forward.

8. The seat of claim 1, wherein the mounting stem extends outward from the mounting bracket at an angle in the range of 80–85 degrees relative to a axis along which the mounting bracket is adapted to engage the handlebar stem.

9. A child seat comprising:
a bottom portion;
a back portion connected to the bottom portion;
first and second side portions connected to the bottom portion and back portion;
first and second leg extensions connected to the bottom portion, each of the leg extensions comprising a bottom portion and an inner wall portion connected to the bottom portion of the leg extension; and
a mounting sleeve connected to a bottom side of the bottom portion, wherein the mounting sleeve has a longitudinal axis that bisects the first and second leg extensions and is positioned adjacent to the bottom side and is aligned generally parallel to the bottom side.

10. The seat of claim 9, wherein the mounting sleeve has a substantially rectangular cross section.

11. The seat of claim 9, further comprising a mounting stem that is substantially horizontal when the mounting bracket is connected to a bicycle and the bicycle is directed straight forward.

12. The seat of claim 9, further comprising a crossbar and a front headrest connected to the crossbar, wherein the front headrest is generally planar and extends outward from the crossbar.

13. A child seat comprising:
a bottom portion;
a back portion connected to the bottom portion;
first and second side portions connected to the bottom portion and back portion;
first and second leg extensions connected to the bottom portion, each of the leg extensions comprising a bottom portion and an inner wall portion connected to the bottom portion of the leg extension; and
a mounting sleeve connected to a bottom side of the bottom portion, wherein the mounting sleeve has a longitudinal axis that bisects the first and second leg extensions;
a mounting stem that is removeably received in the mounting sleeve; and
a mounting bracket connected to an end of the mounting stem, wherein the mounting bracket is capable of fixedly connecting to a handlebar stem of a bicycle, wherein the handlebar stem has a longitudinal axis and turns about the longitudinal axis in response to movement of handlebars connected to the handlebar stem,
wherein the mounting stem extends from the mounting bracket at an angle relative to the longitudinal axis of the handlebar stem, wherein the angle is in the range of 80–85 degrees.

14. A cycle comprising;
a frame;
forks adapted to hold a wheel, the forks being connected to the frame;
handlebars that control movement of the forks;
a handlebar stem extending between the handlebars and the forks;
a child seat mounting bracket connected to the handlebar stem, wherein the bracket is attached to a first end of a mounting stem extending generally outward from the handlebar stem, toward a rear portion of the frame; and
a seat body comprising;
a bottom portion; and
a mounting sleeve connected to the bottom portion, wherein the mounting sleeve is positioned adjacent and parallel to the bottom portion and matingly receives a second end of the mounting stem.

15. The cycle of claim 14, wherein the cycle is a bicycle having front and rear wheels.

16. The cycle of claim 14, wherein the mounting bracket comprises first and second connectors that attach to opposing sides of the handlebar stem, wherein the mounting stem is attached to the second connector.

17. The cycle of claim 14, wherein the mounting stem extends from the mounting bracket to form an angle relative to the handlebar stem, in the range of 80–85 degrees.

18. The cycle of claim 14, wherein the seat body further comprises a crossbar and a front headrest connected to the crossbar, wherein the front headrest is generally planar and extends outward from the crossbar.

* * * * *